(12) United States Patent
Alloway et al.

(10) Patent No.: US 11,280,295 B2
(45) Date of Patent: Mar. 22, 2022

(54) BEADED FINGER ATTACHMENT

(71) Applicant: ROHR, INC., Chula Vista, CA (US)

(72) Inventors: Richard Scott Alloway, San Diego, CA (US); Vijay V. Pujar, San Diego, CA (US); Stuart J. Byrne, San Diego, CA (US); Adam G. Saunders, Chula Vista, CA (US); Gary Euan Bowman, Lenzie (GB)

(73) Assignee: Rohr, Inc., Chula Vista, CA (US)

( * ) Notice: Subject to any disclaimer, the term of this patent is extended or adjusted under 35 U.S.C. 154(b) by 276 days.

(21) Appl. No.: 16/299,992

(22) Filed: Mar. 12, 2019

(65) Prior Publication Data

US 2020/0291895 A1 Sep. 17, 2020

(51) Int. Cl.
| F02K 1/80 | (2006.01) |
| F02C 7/20 | (2006.01) |
| F01D 25/24 | (2006.01) |
| F01D 25/00 | (2006.01) |
| F02K 1/04 | (2006.01) |
| F23R 3/60 | (2006.01) |

(52) U.S. Cl.
CPC .............. *F02K 1/80* (2013.01); *F01D 25/005* (2013.01); *F02C 7/20* (2013.01); *F02K 1/04* (2013.01); *F05C 2203/08* (2013.01); *F23R 3/60* (2013.01)

(58) Field of Classification Search
CPC ..... F02C 7/20; F02K 1/80; F02K 1/04; F02K 1/82; F01D 25/243; B64D 29/06
See application file for complete search history.

(56) References Cited

U.S. PATENT DOCUMENTS

| 2,679,991 | A | 6/1954 | Eagon |
| 5,706,655 | A * | 1/1998 | Kojima ............... F01N 13/102 60/322 |
| 7,234,306 | B2 | 6/2007 | Aumont et al. |
| 8,205,453 | B2 | 6/2012 | Conete |
| 8,424,312 | B2 | 4/2013 | Conete et al. |
| 8,726,675 | B2 | 5/2014 | Keith et al. |
| 10,100,664 | B2 | 10/2018 | Renggli et al. |
| 2008/0034759 | A1 | 2/2008 | Bulman et al. |
| 2011/0133025 | A1 | 6/2011 | Vauchel et al. |
| 2011/0203255 | A1 | 8/2011 | Conete |
| 2012/0171023 | A1* | 7/2012 | Albers ............... F01D 25/243 415/173.1 |
| 2015/0075176 | A1 | 3/2015 | Ruthemeyer et al. |
| 2015/0083822 | A1 | 3/2015 | Mecuson et al. |
| 2015/0226083 | A1 | 8/2015 | Renggli et al. |

(Continued)

FOREIGN PATENT DOCUMENTS

EP     1152191     9/2006

OTHER PUBLICATIONS

European Patent Office, Partial European Search Report dated Sep. 24, 2020 in Application No. 19216282.4.

(Continued)

*Primary Examiner* — Andrew H Nguyen
(74) *Attorney, Agent, or Firm* — Snell & Wilmer L.L.P.

(57) ABSTRACT

A nacelle system is disclosed. In various embodiments, the nacelle system may include a nacelle component; an attachment structure; and a bracket configured to secure the nacelle component to the attachment structure, the bracket comprising a first arm having a first bead structure disposed between a proximal end and a distal end of the bracket.

13 Claims, 6 Drawing Sheets

(56) References Cited

U.S. PATENT DOCUMENTS

2015/0260104 A1   9/2015  Wilson et al.
2015/0330308 A1*  11/2015 Goupil .................... F02C 9/18
                                                   415/144
2018/0066605 A1*  3/2018  Todorovic ............... F02K 1/386

OTHER PUBLICATIONS

European Patent Office, European Office Action dated Oct. 22, 2020 in Application No. 19216282.4.
European Patent Office, European Partial Search Report dated Feb. 25, 2021 in Application No. 19216282.4.

* cited by examiner

BEADED FINGER ATTACHMENT

FIELD

The present disclosure relates to gas turbine engines and, more particularly, to attachment systems used to secure nacelle components for exhaust systems constructed of composite materials, such as, for example, nozzles, nozzle fairings, center bodies, aft core cowls and heat shields, to metallic attachment rings or related structures.

BACKGROUND

Modern commercial aircraft employ various gas turbine engines for propulsion. The exhaust systems used with such gas turbine engines typically include a center body surrounded by an annular nozzle to form an annular passageway downstream of a core engine surrounded by a nacelle system. A high-temperature core engine flow stream typically exits a downstream turbine stage of the core engine and is subsequently exhausted as a high-temperature exhaust stream from the core engine through the annular passageway.

The center bodies and the surrounding annular nozzles comprising such annular passageways are often subject to extreme heat of the high-temperature exhaust stream. Other components proximate the exhaust center body and the annular nozzle, such as, for example, a pylon fairing and an aft core cowl of a thrust reverser are also subject to the high temperature exhaust stream. As the maximum temperatures of exhaust streams trend ever higher, ceramic materials, ceramic matrix composite (CMC) materials and other similar materials exhibiting high temperature capabilities have been proposed for forming the various components of the nacelle systems and, in particular, the components directly subject to the hot exhaust streams, including the exhaust center bodies, the exhaust annular nozzles, the aft core cowl and the pylon fairings of such nacelle systems.

Various challenges arise when employing exhaust systems constructed from ceramic or CMC materials within the exhaust systems of gas turbine engines. One such challenge concerns the disparate thermal expansion properties between the ceramic or CMC-based exhaust system components and the metallic structures to which they are typically attached. For example, in exhaust systems employing ceramic composite components attached to metallic support structures, the metallic support structures will typically expand to greater degrees than will the ceramic composite components when the systems reach elevated operating temperatures. The design of mechanisms used to attach ceramic composite components to metallic support structures should, therefore, take into account and accommodate the relative expansion and movement between the ceramic composite components and the metallic support structures.

SUMMARY

A nacelle system is disclosed. In various embodiments, the nacelle system includes a nacelle component; an attachment structure; and a bracket configured to secure the nacelle component to the attachment structure, the bracket comprising a first arm having a first bead structure and a first flex portion disposed between a proximal end and a distal end of the bracket.

In various embodiments, the bracket includes a second arm, the second arm and the first arm connected proximate the proximal end of the bracket. In various embodiments, the second arm includes a second bead structure and a second flex portion disposed between the proximal end and the distal end of the bracket. In various embodiments, the proximal end of the bracket includes a proximal-end aperture configured to receive a proximal-end fastener for securing the proximal end of the bracket to the at least one of the nozzle, the center body, the pylon fairing and the aft core cowl. In various embodiments, the distal end of the bracket includes a first distal-end aperture extending through the first arm proximate the distal end of the bracket and configured to receive a first distal-end fastener for securing the distal end of the bracket to the attachment structure. In various embodiments, the distal end of the bracket includes a second distal-end aperture extending through the second arm proximate the distal end of the bracket and configured to receive a second distal-end fastener for securing the distal end of the bracket to the attachment structure.

In various embodiments, the nacelle component is one of an exhaust nozzle, an exhaust center body, a pylon fairing and an aft core cowl constructed of a composite material and the attachment structure is constructed of a metallic material. In various embodiments, the composite material is characterized by a composite material coefficient of thermal expansion that is different from a metallic material coefficient of thermal expansion that characterizes the metallic material.

In various embodiments, the first arm defines a first arm length between the proximal end and the distal end and the first bead structure extends along the first arm at least about twenty percent of the first arm length. In various embodiments, the bracket includes a second arm and a second bead structure disposed on the second arm, the second arm defines a second arm length between the proximal end and the distal end and the second bead structure extends along the second arm at least about twenty percent of the second arm length.

In various embodiments, the attachment structure includes an attachment ring and an attachment flange extending radially from the attachment ring and a first distal-end aperture extending through the first arm proximate the distal end of the bracket is configured to receive a first distal-end fastener for securing the distal end of the bracket to the attachment ring. In various embodiments, a second distal-end aperture extends through the second arm proximate the distal end of the bracket and is configured to receive a second distal-end fastener for securing the distal end of the bracket to the attachment ring. In various embodiments, the attachment flange extends radially inward of the attachment ring or radially outward of the attachment ring.

A bracket configured to secure a nacelle component of a nacelle system to an attachment structure is disclosed. In various embodiments, the bracket includes a first arm having a first bead structure and a first flex portion disposed along a first arm length of the first arm between a proximal end and a distal end of the bracket; and a second arm having a second bead structure and a second flex portion disposed along a second arm length of the second arm between the proximal end and the distal end of the bracket, the second arm and the first arm connected proximate the proximal end of the bracket.

In various embodiments, the proximal end of the bracket includes a proximal-end aperture configured to receive a proximal-end fastener for securing the proximal end of the bracket to at least one of a nozzle, a center body, a pylon fairing and an aft core cowl. In various embodiments, the distal end of the bracket includes a first distal-end aperture extending through the first arm proximate the distal end of the bracket and configured to receive a first distal-end fastener for securing the distal end of the bracket to the attachment structure and the distal end of the bracket includes a second distal-end aperture extending through the second arm proximate the distal end of the bracket and configured to receive a second distal-end fastener for securing the distal end of the bracket to the attachment structure.

In various embodiments, the first bead structure extends along the first arm at least about twenty percent of the first arm length and the second bead structure extends along the second arm at least about twenty percent of the second arm length. In various embodiments, the proximal end of the bracket includes a proximal end tab portion including a proximal end bead structure and the distal end includes a first distal end tab portion including a first distal end-bead structure disposed proximate the distal end of first arm and a second distal end tab portion including a second distal end-bead structure disposed proximate the distal end of the second arm.

A method for securing a component of a nacelle system to an attachment structure is disclosed. In various embodiments, the method includes the steps of positioning the component in alignment with the attachment structure; and securing the component to the attachment structure using a bracket comprising a first arm having a first bead structure and a first flex portion disposed along a first length of the first arm between a proximal end and a distal end of the bracket, and a second arm having a second bead structure and a second flex portion disposed along a second length of the second arm between the proximal end and the distal end of the bracket, the second arm and the first arm connected proximate the proximal end of the bracket.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
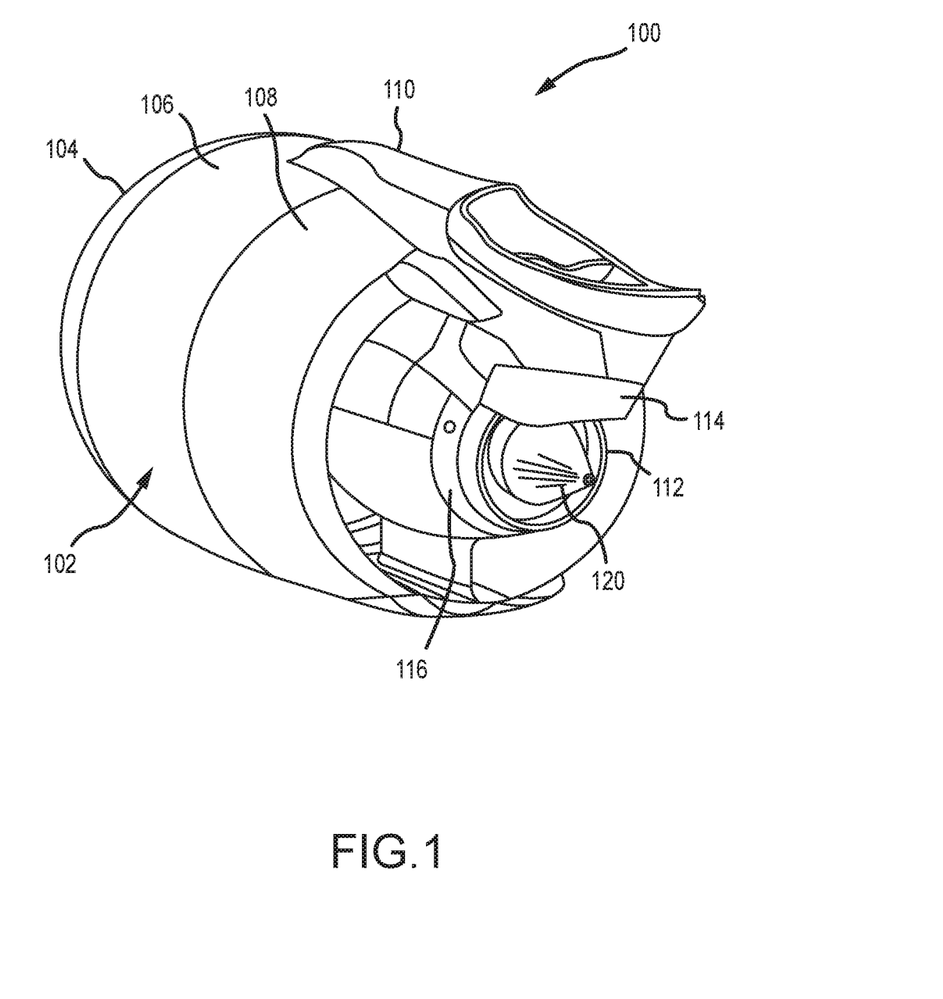
FIG. 1 is a perspective view of a gas turbine engine, in accordance with various embodiments.

Referring to FIG. 1, a gas turbine engine 100 is illustrated according to various embodiments. The gas turbine engine 100 includes a nacelle 102 that surrounds a core engine structure. In various embodiments, the nacelle 102 includes an inlet 104, a fan cowl 106 and a thrust reverser 108. The nacelle 102 may be coupled to a pylon 110, which may mount the nacelle 102 and the core engine structure to an aircraft wing or aircraft body. The nacelle 102 may further include an exhaust nozzle assembly including a nozzle 112 surrounding a center body 120 having a generally conical shape and, in various embodiments, the associated attachment structure. A high-temperature exhaust stream from the core engine structure exits the gas turbine engine 100 between the nozzle 112 and the center body 120. The nozzle 112 and the center body 120 may each be coupled to the core engine structure via an attachment system, which may include, for example, a center body attachment system or a nozzle attachment system. As described below with reference to FIG. 2, the attachment system is applied to the nozzle and nozzle fairing 112, though the attachment system is equally applicable to the center body 120 or to other related components of the gas turbine engine 100, such as, for example, a pylon fairing 114 or an aft core cowl 116. Broadly speaking, the various components described above comprising or relating to the nacelle 102, including the nozzle 112, the center body 120, the pylon fairing 114 and the aft core cowl 116 may be components comprising a nacelle system 103 or a nacelle exhaust system 105.

Figure 2A:
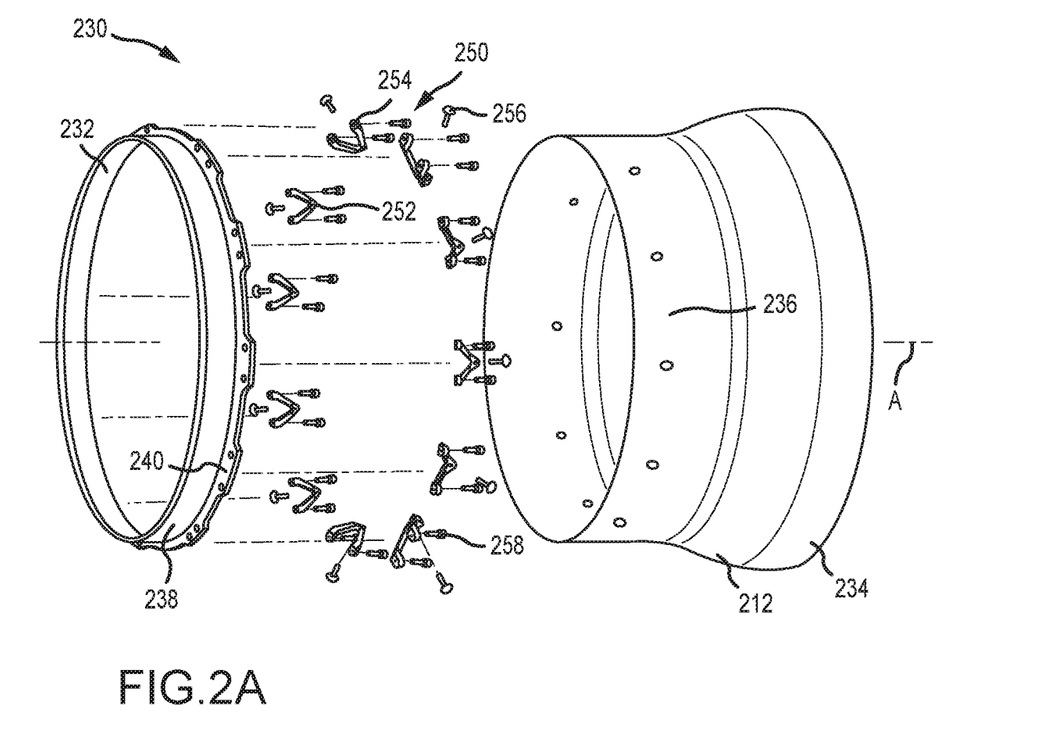
FIGS. 2A and 2B are perspective exploded and assembled views of a nozzle and an attachment ring, in accordance with various embodiments.
Figure 2B:
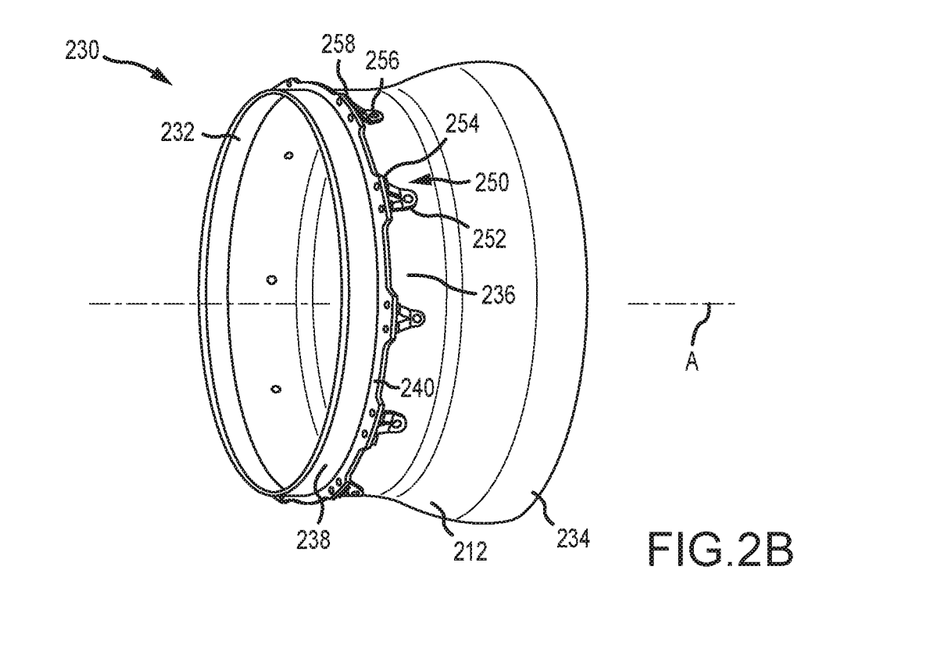

Referring now to FIGS. 2A and 2B, a nozzle system 230 is illustrated, in both exploded and assembled form. In various embodiments, the nozzle system 230 includes a nozzle 212 and a nozzle attachment structure 232, which may itself be attached to a downstream portion or flange of a core engine structure. The nozzle 212 and the nozzle attachment structure 232 may be positioned relative to one another about a longitudinal axis A extending in a generally axial direction. In various embodiments, the nozzle 212 includes a nozzle housing 234 and a nozzle ring 236, both constructed of a ceramic matrix composite (CMC). The nozzle housing 234 and the nozzle ring 236 may comprise a monolithic unit, constructed of the same CMC. The nozzle attachment structure 232 may comprise an attachment ring 238 and an attachment flange 240. In various embodiments, both the nozzle ring 236 and the attachment ring 238 define annular rings having inner and outer diameters that are substantially equal and configured to abut each other, such that the nozzle housing 234 abuts the nozzle attachment structure 232 when assembled. A bracket 250 (or a plurality of such brackets) is configured to attach the nozzle housing 234 to the nozzle attachment structure 232. In various embodiments, the bracket 250 has a first end 252 configured for attachment to the nozzle ring 236 and a pair of arms 254 configured for attachment to the attachment flange 240, which extends in a generally radial direction from the attachment ring 238. A first plurality of bolts 256 secures the first end 252 of the bracket 250 to the nozzle ring 236 and a second plurality of bolts 258 secures the pair of arms 254 to the attachment flange 240.

In various embodiments, the nozzle attachment structure 232 may exhibit a coefficient of thermal expansion greater than the coefficient of thermal expansion of the nozzle housing 234 and the nozzle ring 236. In various embodiments, the nozzle attachment structure 232 may comprise an austenitic nickel-chromium-based alloy such as Inconel®, which is available from Special Metals Corporation of New Hartford, N.Y., USA, or similar materials, including nickel and chromium-based alloys, nickel-chromium superalloys, nickel-cobalt high temperature alloys, and wrought gamma-prime strengthened superalloys. The nozzle system 230 may be subject to operating environments that experience a wide range of temperatures, such as from −65° F. to 4082° F. (or approx. −54° C. to 2250° C.). Because of the differences in thermal expansion coefficients, the nozzle attachment structure 232 may expand a greater distance (e.g., in the radial direction) than the nozzle housing 234 and the nozzle ring 236 in response to the same increase in temperature. To alleviate any tendency of the components to crack or otherwise be damaged due to the differences in thermal expansion, between one or more of the nozzle attachment structure 232 and the nozzle housing 234 or the nozzle ring 236, the bracket 250 (or the plurality of such brackets) is configured to accommodate such differential expansion, without subjecting the nozzle housing 234 or the nozzle ring 236 to undesirable loads due to differing rates of thermal expansion between the CMC material of the nozzle 212 and the metallic material of the nozzle attachment structure 232.

Referring now to FIGS. 3A-3F, a bracket 350, such as, for example, the bracket 250 described above with reference to FIGS. 2A and 2B, is illustrated. The bracket 350 is a component of a nozzle system 330 and is configured to secure a nozzle 312 to a nozzle attachment structure 332. More specifically, in various embodiments, the bracket 350 is configured to secure a nozzle ring 336 of the nozzle 312 to an attachment flange 340, which extends in a generally radial direction R from an attachment ring 338, the radial direction R being generally perpendicular to an axial direction A (as defined above with reference to FIGS. 2A and 2B). While the attachment flange 340 is depicted as extending radially outward of the attachment ring 338 (as also depicted in FIGS. 2A and 2B), the disclosure also contemplates the attachment flange 340 as extending radially inward of the attachment ring 338. This latter configuration would be more applicable, for example, for attaching a center body to a center body attachment structure, enabling the flow of exhaust gases to be undisturbed by the brackets while flowing about the exterior of the center body. In contrast, the former configuration is more applicable for attaching the nozzle 312 to the nozzle attachment structure 332, enabling the flow of exhaust gases to be undisturbed by the brackets while flowing through the interior of the nozzle 312.

In various embodiments, the bracket 350 includes at least a first arm 352 extending between a proximal end 354 of the bracket 350 and a distal end 356 of the bracket 350. The proximal end 354 of the bracket 350 is configured for attachment to the nozzle 312 and, in various embodiments, to the nozzle ring 336 of the nozzle 312. The distal end 356 of the bracket 350 is configured for attachment to the nozzle attachment structure 332 and, in various embodiments, to the attachment flange 340 of the nozzle attachment structure 332. In various embodiments, the first arm 352 may be disposed at an angle 358 with respect to the axial direction A, which may range from about zero degrees) (0°) to about eighty degrees) (80°) or, in various embodiments, from about thirty degrees) (30°) to about sixty degrees) (60°) or, in various embodiments, the angle 358 is equal to about forty-five degrees) (45°). For those embodiments where the attachment flange 340 extends radially inward of the attachment ring 338, the angle 358 is the negative of the above recited values.

In various embodiments, the first arm 352 includes a first bead structure 360. The first bead structure 360 may extend radially inward (or, in various embodiments, radially outward) of an upper surface 362 of the first arm 352 and extends a first bead length 364 along at least a portion of a first arm length 366 that extends between the proximal end 354 and the distal end 356 of the bracket 350. In various embodiments, the first bead length may range from about twenty percent (20%) to about seventy percent (70%) of the first arm length 366. In various embodiments, the first bead structure 360 may be formed by plastically deforming the first arm 352 following fabrication of the first arm 352 or, alternatively, may be formed together with the first arm 352, using, for example, an additive manufacturing process.

In various embodiments, the proximal end 354 of the bracket 350 includes a proximal end tab portion 368. The proximal end tab portion 368 may include a proximal end aperture 370 configured to receive a proximal end fastener (e.g., one of the first plurality of bolts 256 described above with reference to FIGS. 2A and 2B) configured to secure the proximal end tab portion 368 to the nozzle ring 336 of the nozzle 312. In various embodiments, the distal end 356 may include a first distal end tab portion 372. The first distal end tab portion 372 may include a first distal end aperture 374 configured to receive a first distal-end fastener (e.g., one of the second plurality of bolts 258 described above with reference to FIGS. 2A and 2B) for securing the distal end 356 of the bracket 350 to the nozzle attachment structure 332 (or to the attachment flange 340). In various embodiments, the proximal end tab portion 368, the first distal end tab portion 372 and the first arm 352 comprise a monolithic structure, fabricated from the same materials described above that may be used to fabricate the nozzle attachment structure 332.

The foregoing single-arm embodiment (e.g., the first arm 352) may be employed to secure the nozzle 312 to the nozzle attachment structure 332. However, in various embodiments, the bracket 350 includes a second arm 376. The second arm 376 may include a second bead structure 378 that shares similar characteristics of the first bead structure 360. For example, the second bead structure 378 may extend radially inward (or, in various embodiments, radially outward) of an upper surface of the second arm 376 and may extend a second bead length along at least a portion of a second arm length that extends between the proximal end 354 and the distal end 356 of the bracket 350. In various embodiments, the second bead length may range from about twenty percent (20%) to about seventy percent (70%) of the second arm length. In various embodiments, the second bead structure 378 may be formed by plastically deforming the second arm 376 following fabrication of the second arm 376 or, in various embodiments, may be formed together with the second arm 376, using, for example, an additive manufacturing process.

In various embodiments, the first arm 352 and the second arm 376 are connected at the proximal end 354 of the bracket 350 or, more particularly, the proximal end tab portion 368 of the bracket 350. In various embodiments, the first arm 352 and the second arm 376 extend from the proximal end 354 of the bracket 350 at an angle 380, that may range from about zero degrees) (0°) to about seventy-five degrees) (75°), from about thirty degrees) (30°) to about sixty degrees) (60°) or be equal to about forty-five degrees) (45°). In various embodiments, the distal end 356 may include a second distal end tab portion 382. The second distal end tab portion 382 may include a second distal end aperture 384 configured to receive a second distal-end fastener (e.g., one of the second plurality of bolts 258 described above with reference to FIGS. 2A and 2B) for securing the distal end 356 of the bracket 350 to the nozzle attachment structure 332 (or to the attachment flange 340). In various embodiments, the proximal end tab portion 368, the first distal end tab portion 372 and the first arm 352, together with the second distal end tab portion 382 and the second arm 376, comprise a monolithic structure, fabricated from the same materials described above that may be used to fabricate the nozzle attachment structure 332.

Figure 3A:
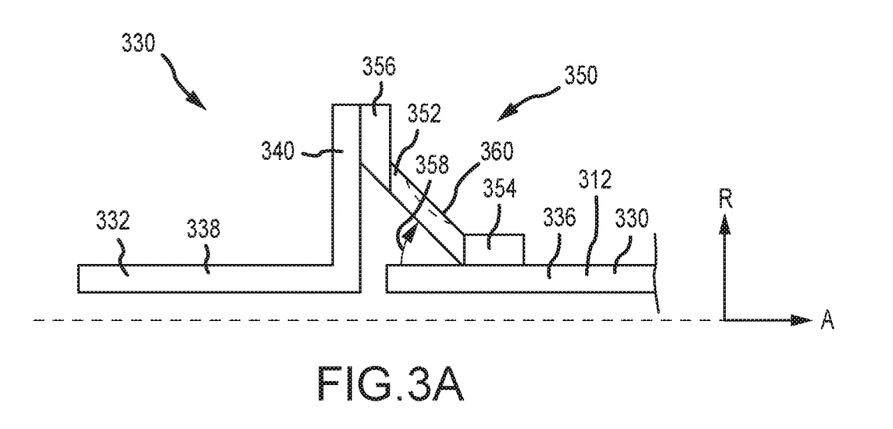
FIG. 3A is a cross sectional view of a bracket used to connect a nozzle or other component of a nacelle system to an attachment ring, in accordance with various embodiments.
Figure 3B:
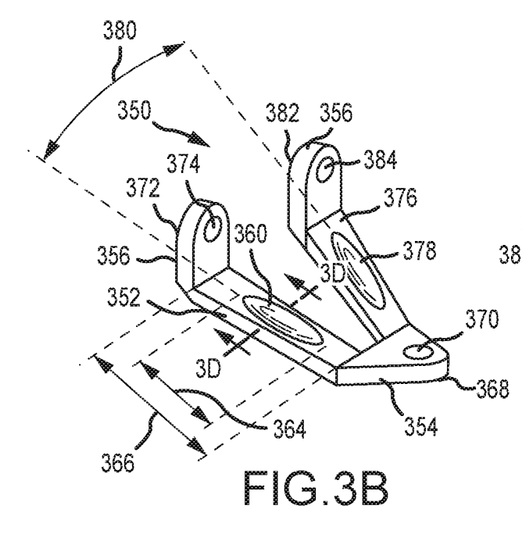
FIGS. 3B and 3C are perspective views of brackets used to connect a nozzle or other component of a nacelle system to an attachment ring, in accordance with various embodiments.
Figure 3C:
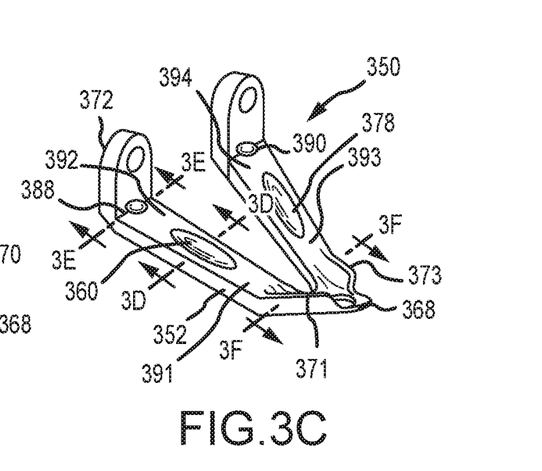
Figure 3D:
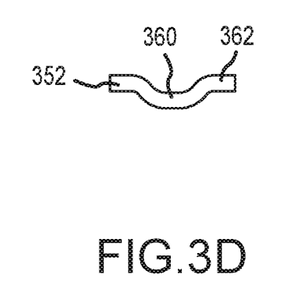
FIGS. 3D, 3E and 3F are cross sectional views of a bracket used to connect a nozzle or other component of a nacelle system to an attachment ring, in accordance with various embodiments.
Figure 3E:
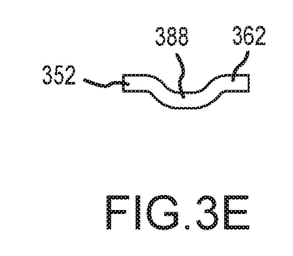
Figure 3F:
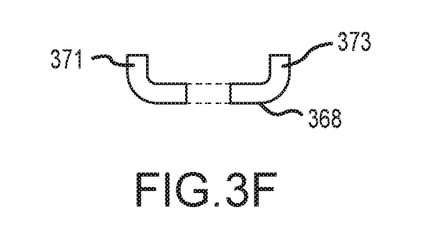

Referring more particularly to FIG. 3C (and also to FIGS. 3D, 3E and 3F), in various embodiments, the bracket 350 may also include a first proximal end flange 371 and a second proximal end flange 373 disposed along the proximal end tab portion 368, a first distal end bead structure 388 disposed proximate a distal end of first arm 352 and a second distal end bead structure 390 disposed proximate a distal end of the second arm 376. In various embodiments, the first proximal end flange 371, the second proximal end flange 373, the first distal end bead structure 388 and the second distal end bead structure 390 may be fabricated into the corresponding portions as described above with reference to the first bead structure 360 and the second bead structure 378. In various embodiments, the first distal end bead structure 388 and the second distal end bead structure 390, provide local stiffening to the bracket 350 and act as localized areas of load distribution, enabling the attached components (e.g., the nozzle 312 and the nozzle attachment structure 332) to be firmly mounted with an optimized structure. The local stiffening also allows the bracket 350 to carry high axial loads (e.g., along the lengths of the arms) by resisting buckling and allows the arms to be made thinner, which reduces heat transfer along the length of the bracket 350 (or along the arms of the bracket), thereby keeping the bracket cooler than would otherwise be the case. As described below, proximate the localized areas of stiffening are one or more flex portions configured to facilitate flexing of the bracket 350.

In various embodiments, the first proximal end flange 371 and the second proximal end flange 373 provide a load transfer pocket that surrounds a fastener head (e.g., a bolt head). The flanges may function to distribute loads evenly around the head of the fastener and improve heal toe loading around the fastener. The load transfer pocket resulting from the flanges may also allow for the proximal end tab portion 368 to be thinner than otherwise, thereby reducing weight and reducing a heat transfer path between attachment locations at the proximal and distal ends of the bracket 350. Disposed on either side of the first bead structure 360 is a first flexing portion 391 and a second flexing portion 392. Similarly, disposed on either side of the second bead structure 378 is a first flexing portion 393 and a second flexing portion 394. In various embodiments, the flex portions (or flex joints), accommodate thermal expansion between the attachment structure and the attached components (e.g., the nozzle 312 and the nozzle attachment structure 332).

Figure 4:
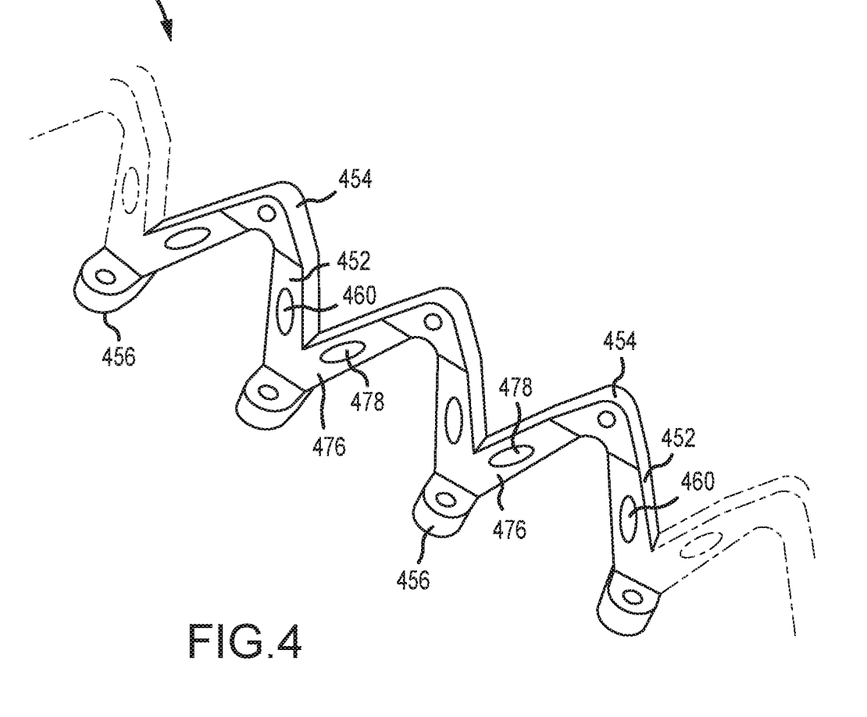
FIG. 4 is a perspective partial view of a bracket used to connect a nozzle or other component of a nacelle system to an attachment ring, in accordance with various embodiments.

Referring now to FIG. 4, a bracket 450 is illustrated, in accordance with various embodiments. The bracket 450 is a component of a nozzle system and is configured to secure a nozzle to a nozzle attachment structure, such as, for example, the nozzle 212 and the nozzle attachment structure 232 described above with reference to FIGS. 2A and 2B. In various embodiments, the bracket 450 includes a plurality of proximal ends 454 configured for attachment to the nozzle (e.g., the nozzle 212 described above) and a plurality of distal ends 456 configured for attachment to the nozzle attachment structure (e.g., the nozzle attachment structure 232 described above). Similar to the above description, the bracket 450 may also include a plurality of first bead structures 460 disposed on a plurality of first arms 452 and a plurality of second bead structures 478 disposed on a plurality of second arms 476. In various embodiments, the bracket 450 may comprise a monolithic structure that extends about the entire circumference of the nozzle (or the nozzle attachment structure) and, in various embodiments, the bracket 450 may comprise a plurality of sections that each extend about a portion of the entire circumference of the nozzle (or the nozzle attachment structure). For example, in various embodiments, the bracket 450 may be configured to extend about ninety degrees) (90°) of the entire circumference, together with three other brackets similarly constructed to encircle the entire circumference of the nozzle. As indicated above, a similar structure may be used to attach other components to one another, such as, for example, a center body to a center body attachment structure.

Figure 5A:
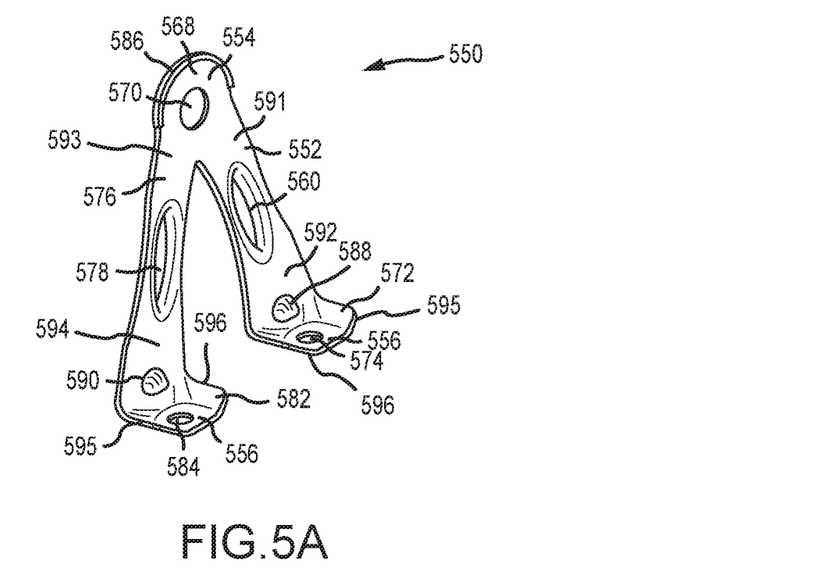
FIGS. 5A and 5B are perspective and side views of a bracket used to connect a component of a nacelle system to an attachment structure, in accordance with various embodiments.
Figure 5B:
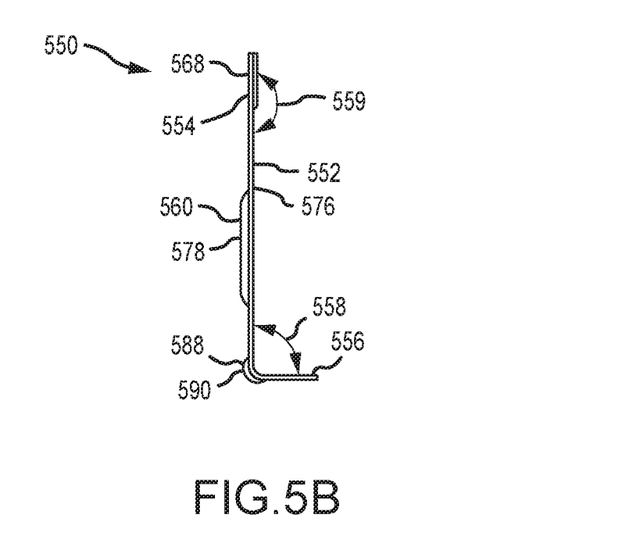

Referring now to FIGS. 5A and 5B, a bracket 550, such as, for example, the bracket 250 described above with reference to FIGS. 2A and 2B, is illustrated. The bracket 550 is a component of a nacelle system, such as, for example, the nacelle system 103 described above with reference to FIG. 1. For example, in various embodiments, the bracket 550 is configured to secure a nozzle ring of a nozzle to an attachment flange, such as, for example, the nozzle ring 236 of the nozzle 212 to the attachment flange 240, described above with reference to FIGS. 2A and 2B. A similar structure may be used to attach other components to one another, such as, for example, a center body to a center body attachment structure. In various embodiments, the bracket 550 includes a first arm 552 including a first bead structure 560 and a second arm 576 including a second bead structure 578. Similar to the above description, the first bead structure 560 may extend radially inward (or, in various embodiments, radially outward) of an upper surface 562 of the first arm 552 and second bead structure 578 may extend radially inward (or, in various embodiments, radially outward) of an upper surface of the second arm 576.

In various embodiments, a proximal end 554 of the bracket 550 includes a proximal end tab portion 568. The proximal end tab portion 568 may include a proximal end aperture 570 configured to receive a proximal end fastener (e.g., one of the first plurality of bolts 256 described above with reference to FIGS. 2A and 2B) configured to secure the proximal end tab portion 568 to a component of a nacelle assembly. In various embodiments, a distal end 556 may include a first distal end tab portion 572 and a second distal end tab portion 582. The first distal end tab portion 572 may include a first distal end aperture 574 configured to receive a first distal-end fastener (e.g., one of the second plurality of bolts 258 described above with reference to FIGS. 2A and 2B) for securing the distal end 556 of the bracket 550 to a component of the nacelle assembly. Similarly, the second distal end tab portion 582 may include a second distal end aperture 584 configured to receive a second distal-end fastener for securing the distal end 556 of the bracket 550 to a component of the nacelle assembly. Broadly speaking, in various embodiments, the nacelle assembly or the components of the nacelle assembly may include any of the nacelle components or the attachment structure above described, any one or all of which may be constructed of the composite materials or the metallic materials above described.

Still referring to FIGS. 5A and 5B, in various embodiments, the bracket 550 may also include a proximal end flange structure 586 disposed proximate the proximal end tab portion 568. In various embodiments, the proximal end flange structure 586 may extend a circumferential portion about the proximal end aperture 570. A first distal end bead structure 588 may be disposed proximate a distal end of first arm 552 and a second distal end bead structure 590 may be disposed proximate a distal end of the second arm 576. In various embodiments, the proximal end tab portion 568, the first bead structure 560 and the first distal end bead structure 588 provide a first flexing portion 591 and a second flexing portion 592 on the first arm 552 and the proximal end tab portion 568, the second bead structure 578 and the second distal end bead structure 590 provide a first flexing portion 593 and a second flexing portion 594 on the second arm 576. As noted above, the flexing portions adjacent the various bead structures (or one or more of the various bead structures) act as localized areas of flexure, enabling the attached components to move relative to one another during operation due to disparate coefficients of thermal expansion. Similar to the description of FIG. 3C, above, in various embodiments, one or both of the first distal end tab portion 572 and the second distal end tab portion 582 may include a first distal end flange 595 and a second distal end flange 596 disposed along the sides of the distal end tab portions. Similar to the description with FIG. 3A, above, in various embodiments, the first arm 552 and the second arm 576 may be disposed at a first angle 558, with respect to, respectively, the first distal end tab portion 572 and the second distal end tab portion 582. In various embodiments, the first angle 558 may range from about zero degrees) (0°) to about ninety degrees) (90°) (as indicated in FIG. 5B). A second angle 559 may be defined between the proximal end tab portion 568 and the first arm 552 and between the proximal end tab portion 568 and the second arm 576. In various embodiments, the second angle 559 may range from about ninety degrees) (90°) to about one-hundred eighty degrees) (180°).

Figure 6:
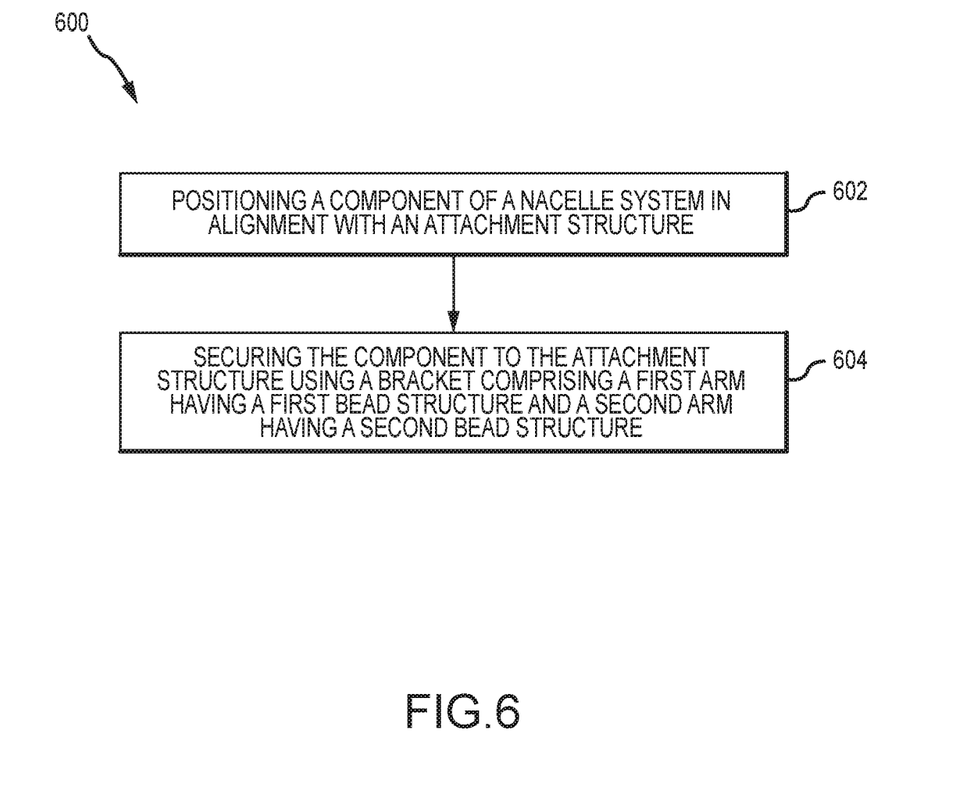
FIG. 6 is a flowchart describing steps in a method for securing a component of a nacelle system an attachment structure, in accordance with various embodiments.

Referring now to FIG. 6, a method 600 for securing a component of a nacelle system to an attachment structure is described. In a first step 602, a component is positioned in alignment with an attachment structure. In a second step 604, the component is secured to the attachment structure using a bracket comprising at least a first arm having a first bead structure disposed along a first length of the first arm between a proximal end and a distal end of the bracket and, in various embodiments, a second arm having a second bead structure disposed along a second length of the second arm between the proximal end and the distal end of the bracket. In various embodiments, the second arm and the first arm are connected proximate the proximal end of the bracket.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A nacelle system, comprising:
a nacelle component;
an attachment structure; and
a bracket configured to secure the nacelle component to the attachment structure, the bracket comprising
a first arm having a first arm bead structure and a first arm flex portion disposed along a first arm length of the first arm between a proximal end tab portion located at a proximal end of the bracket and a first distal end tab portion located at a first arm distal end of the bracket, the first arm flex portion disposed between the proximal end tab portion and the first arm bead structure, and
a second arm having a second arm bead structure and a second arm flex portion disposed along a second arm length of the second arm between the proximal end tab portion located at the proximal end of the bracket and a second distal end tab portion located at a second arm distal end of the bracket, the second arm flex portion disposed between the proximal end tab portion and the second arm bead structure, the second arm and the first arm connected proximate the proximal end of the bracket,
wherein the first arm bead structure extends along the first arm at least about twenty percent of the first arm length and wherein the second arm bead structure extends along the second arm at least about twenty percent of the second arm length, and
wherein a first arm distal end-bead structure is disposed proximate the first arm distal end of the first arm and a second arm distal end-bead structure is disposed proximate the second arm distal end of the second arm.

2. The nacelle system of claim 1, wherein the proximal end of the bracket includes a proximal-end aperture configured to receive a proximal-end fastener for securing the proximal end of the bracket to the nacelle component.

3. The nacelle system of claim 2, wherein the first arm distal end of the bracket includes a first arm distal-end aperture extending through the first arm proximate the first arm distal end of the bracket and configured to receive a first arm distal-end fastener for securing the first arm distal end of the bracket to the attachment structure.

4. The nacelle system of claim 3, wherein the second arm distal end of the bracket includes a second arm distal-end aperture extending through the second arm proximate the second arm distal end of the bracket and configured to receive a second arm distal-end fastener for securing the second arm distal end of the bracket to the attachment structure.

5. The nacelle system of claim 1, wherein the nacelle component is one of an exhaust nozzle, an exhaust center body, a pylon fairing and an aft core cowl constructed of a composite material and the attachment structure is constructed of a metallic material.

6. The nacelle system of claim 5, wherein the composite material is characterized by a composite material coefficient of thermal expansion that is different from a metallic material coefficient of thermal expansion that characterizes the metallic material.

7. The nacelle system of claim 1, wherein the attachment structure includes an attachment ring and an attachment flange extending radially from the attachment ring and wherein a first arm distal-end aperture extending through the first arm proximate the first arm distal end of the bracket is configured to receive a first arm distal-end fastener for securing the first arm distal end of the bracket to the attachment ring.

8. The nacelle system of claim 7, wherein a second arm distal-end aperture extending through the second arm proximate the second arm distal end of the bracket is configured to receive a second arm distal-end fastener for securing the second arm distal end of the bracket to the attachment ring.

9. The nacelle system of claim 8, wherein the attachment flange extends radially inward of the attachment ring or radially outward of the attachment ring.

10. A bracket configured to secure a nacelle component of a nacelle system to an attachment structure, the bracket comprising:
a first arm having a first arm bead structure and a first arm flex portion disposed along a first arm length of the first arm between a proximal end tab portion located at a proximal end of the bracket and a first distal end tab portion located at a first arm distal end of the bracket, the first arm flex portion disposed between the proximal end tab portion and the first arm bead structure; and
a second arm having a second arm bead structure and a second arm flex portion disposed along a second arm length of the second arm between the proximal end tab portion located at the proximal end of the bracket and a second distal end tab portion located at a second arm distal end of the bracket, the second arm flex portion disposed between the proximal end tab portion and the second arm bead structure, the second arm and the first arm connected proximate the proximal end of the bracket,
wherein the first arm bead structure extends along the first arm at least about twenty percent of the first arm length and wherein the second arm bead structure extends along the second arm at least about twenty percent of the second arm length, and
wherein a first arm distal end-bead structure is disposed proximate the first arm distal end of the first arm and a second arm distal end-bead structure is disposed proximate the second arm distal end of the second arm.

11. The bracket of claim 10, wherein the proximal end of the bracket includes a proximal-end aperture configured to receive a proximal-end fastener for securing the proximal end of the bracket to the nacelle component.

12. The bracket of claim 11, wherein the first arm distal end of the bracket includes a first arm distal-end aperture extending through the first arm proximate the first arm distal end of the bracket and configured to receive a first arm distal-end fastener for securing the first arm distal end of the bracket to the attachment structure and wherein the second arm distal end of the bracket includes a second arm distal-end aperture extending through the second arm proximate the second arm distal end of the bracket and configured to receive a second arm distal-end fastener for securing the second arm distal end of the bracket to the attachment structure.

13. A method for securing a component of a nacelle system to an attachment structure, comprising:
positioning the component in alignment with the attachment structure; and
securing the component to the attachment structure using a bracket comprising
a first arm having a first arm bead structure and a first arm flex portion disposed along a first arm length of the first arm between a proximal end tab portion located at a proximal end of the bracket and a first distal end tab portion located at a first arm distal end of the bracket, the first arm flex portion disposed between the proximal end tab portion and the first arm bead structure; and a second arm having a second arm bead structure and a second arm flex portion disposed along a second arm length of the second arm between the proximal end tab portion located at the proximal end of the bracket and a second distal end tab portion located at a second arm distal end of the bracket, the second arm flex portion disposed between the proximal end tab portion and the second arm bead structure, the second arm and the first arm connected proximate the proximal end of the bracket, wherein the first arm bead structure extends along the first arm at least about twenty percent of the first arm length and wherein the second arm bead structure extends along the second arm at least about twenty percent of the second arm length, and wherein a first arm distal end-bead structure is disposed proximate the first arm distal end of the first arm and a second arm distal end-bead structure is disposed proximate the second arm distal end of the second arm.

\* \* \* \* \*